March 2, 1948.    C. J. WERNER    2,436,909
THERMOSTATIC SWITCH
Filed April 11, 1945

INVENTOR
CALVIN J. WERNER
BY
HIS ATTORNEYS

Patented Mar. 2, 1948

2,436,909

UNITED STATES PATENT OFFICE 2,436,909

THERMOSTATIC SWITCH

Calvin J. Werner, Dayton, Ohio, assignor to General Motors Corporation, Detroit, Mich., a corporation of Delaware Application April 11, 1945, Serial No. 587,755

3 Claims. (Cl. 200—113)

This invention relates to improvements in electrical control devices or switch particularly adapted for electric motors.

The device of the present invention is an improvement over the control device disclosed in my Patent No. 2,242,769 of May 20, 1941. This patented device comprises a switch provided with counteracting spring and thermal electric elements adapted to control both the starting and running windings of the electric motor in accordance with motor conditions.

Normally this device closes both winding circuits of the motor inasmuch as the thermal electric element normally overcomes the effect of the spring to actuate the device into the circuit open position. At starting a heavy surge of current traverses the thermal element causing it to heat up and expand predeterminately as a result of the very heavy surge of current therethrough for a predetermined time, thereby permitting the spring to actuate the device to break the starting winding circuit. The motor now operates with its running winding circuit closed. As long as the current of the normally running motor traverses the thermal element it will not be heated sufficiently to cause it to expand and permit the spring to open the running winding circuit. However, if the motor is stalled or subjected to an overload, the consequent excessive flow of current through the running winding circuit and the thermal electric element will cause a further heating up and thus an additional expansion of said element, thereby again permitting the spring to become effective to actuate the device, this time to break the running winding circuit of the motor.

From this it may be seen that the device primarily provides starting control and overload protection for the motor.

As mentioned, the thermal electric element of the device is so designed that a predetermined heavy surge of current must traverse said thermal electric element for a predetermined time before it will heat up and expand sufficiently to permit the spring to effect opening of the motor starting circuit. This predetermined time is of sufficient duration to permit the motor to attain proper operating speed even when subjected to a heavy load condition, such load condition, however, being under the overload limit.

From the aforegoing it is clear that the device primarily controls operation of the electric motor in accordance with the flow of current through the fields of the motor.

It is among the objects of the present invention to provide a device, constructed and arranged to perform the functions as aforedescribed, with a control mechanism which, in response to and in accordance with varying degrees of temperature ambient thereto, adjusts the device so that longer "off" periods are provided in case the motor heats up excessively for any reason that might cause damage and repeated recycling of the relay. Due to such longer "off" periods of the motor, its temperature is maintained at a safe minimum and damage as a result of overheating is substantially eliminated.

This and other objects of the invention are accomplished by providing the control device with a thermostatically adjustable stop which, when subjected to increasing temperature, as for instance the increasing heat of an electric motor, will so determine the "off" position of the circuit breaker which controls the starting winding circuit of the motor, that the thermal electric element must actuate the device through a predetermined greater range than normally to effect closing of the motor circuits.

Further objects and advantages of the present invention will be apparent from the following description, reference being had to the accompanying drawings, wherein a preferred embodiment of the invention is clearly shown.

Figure 1:
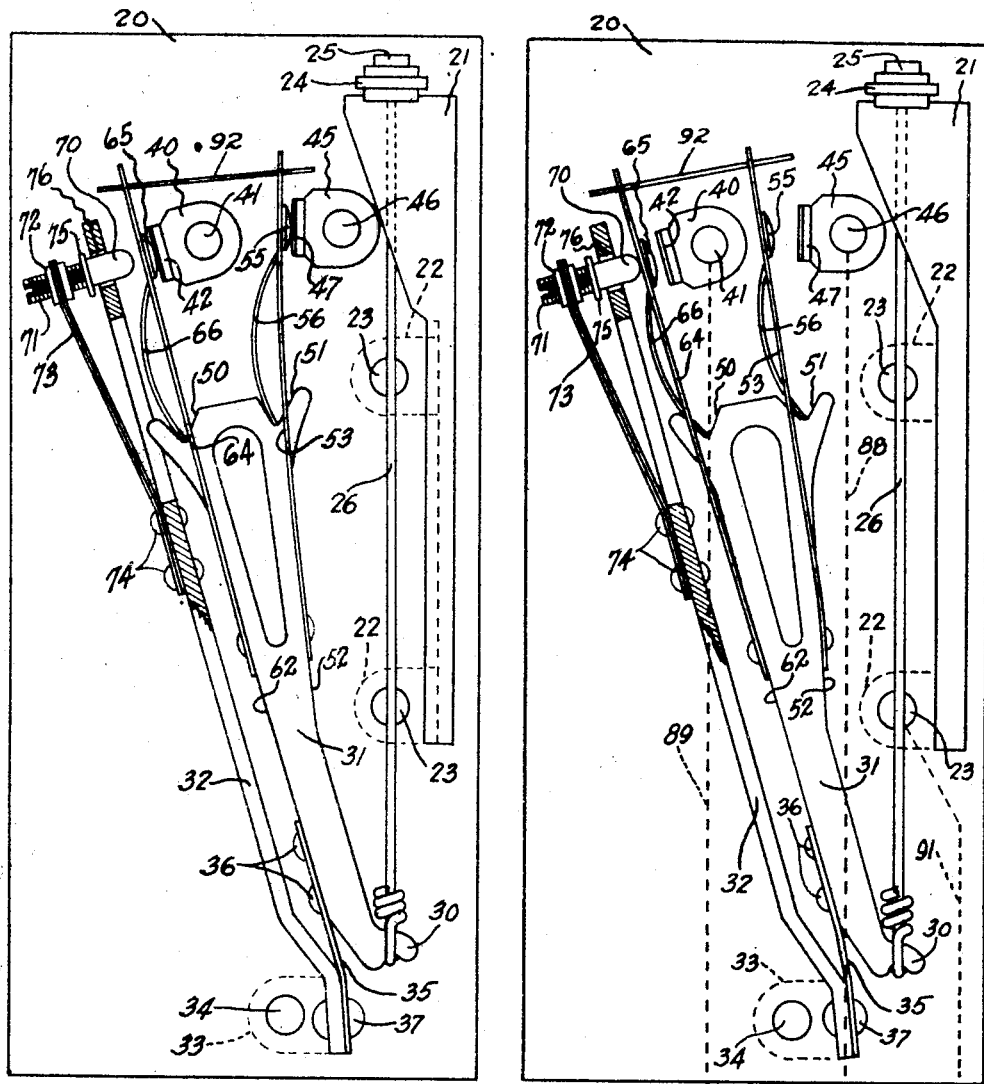
Fig. 1 is a side view of the control device in the motor circuit closing position.

Referring to the drawings, the numeral 20 designates an insulating base upon which the control device is mounted. A bracket 21 has portions extending through openings in the insulating base 20, these portions having feet 22 which are secured to the rear face of the base by rivets 23. The bracket 21 itself is on the front face of the mounting base 20. Bracket 21 carries a nut 24 which threadedly receives a stud 25 to which one end of the thermo-electric element 26 is positively secured. Operation of the nut 24 in one direction or the other will move the stud 25 longitudinally to deflect the thermo-electric element 26, the opposite end of which is attached to a projecting ear 30 formed on the bottom of the shiftable switch frame 31. Another bracket 32 is carried on the front face of the base 20, said bracket having a portion extending through a hole in the base and secured to the rear face of the mounting base 20 by an ear 33 formed on the portion of the bracket extending through the base. A rivet 34 secures the ear to the base. A blade spring 35 has one end portion secured to the switch frame 31 by rivets 36, the opposite end of said blade being secured to the bracket 32 by rivets 37. This blade spring 35 normally urges the switch frame 31 to the right or clockwise as regards Fig. 1 against the restrain of the thermo-electric element 26. At normal temperature the thermo-electric element 26 holds the frame 31 in a position as shown in Fig. 1. However, when heated, thermo-electric element 26 will expand, its resultant lengthening permitting the spring 35 to become effective to move the switch frame 31 to the right or clockwise. The position of the thermo-electric element 26 may be varied by the adjustment of nut 24.

Two stationary terminals 40 and 45 are secured to the insulating base 20 by terminal screws 41 and 46 respectively. Terminal 40 provides the stationary contact element 42 while terminal 45 provides the stationary contact 47.

The switch frame 31 hingedly secured to the frame 32 by spring 35 has V-shaped notches 50 and 51 provided in its free end. Secured to the edge 52 of the switch frame 31 is one end of a resilient blade 53 which carries a contact 55 adapted to engage with stationary contact 47. A resilient finger 56 which is mounted on or as shown struck from a portion of the spring blade 53 has its free end seated in bottom of the V-shaped notch 51 in the switch frame. The contact 55 is urged into engagement with its co-operating contact 47 by the resilient finger 56 of the blade spring 53 only when the end of said finger 56, seating in the notch 51, is on the side of the spring blade 53 opposite that occupied by the stationary contact 47. If the switch frame 31 is moved clockwise by the spring 35 due to expansion of the thermo-electric element 26 so that this point of contact between the resilient finger 56 and the bottom of the V-notch 51 moves to the same side of spring blade 53 as occupied by the stationary contact 47, then said resilient finger 56 urges the blade 53 to the left or counter-clockwise to effect disengagement of contact 55 with its contact 47.

On the side 62 of the switch frame 31 there is attached one end of the spring blade 64, said spring blade 64 supporting a contact 65 adapted to cooperate and engage with stationary contact 42. Like blade 53, this blade 64 has a resilient finger 66 attached to or struck therefrom, the free end of which seats in the bottom of the V-notch 50. When the seating point of the resilient finger 56 in notch 50 is to the left of the blade 64 as shown in Fig. 1, the blade 64 is urged so that its contact 65 engages contact 42. However if, in response to counter-clockwise movement of the frame 31 as a result of expansion of the thermo-electric element 26, this seating point of the finger 66 in notch 50 moves to the other side of blade 64, then the resilient finger 66 exerts a force which urges the blade 64 counter-clockwise to move its contact 65 out of engagement with the stationary contact 42.

To limit the movement of the blade 64 in this counter-clockwise movement, a stop 70 is provided. This stop 70 is a pin having a threaded shank portion 71 received by a nut 72 to which one end of a bi-metallic thermo-element 73 is secured. The other end of this thermal element 73 is rigidly secured to the bracket 32 by rivet 74. A flange 75 on the stop stud 70 is of greater diameter than the hole 76 in bracket 32 through which the stud extends, thereby limiting the movement of the stud through said bracket in a direction toward the contact blade 64.

Figure 2:
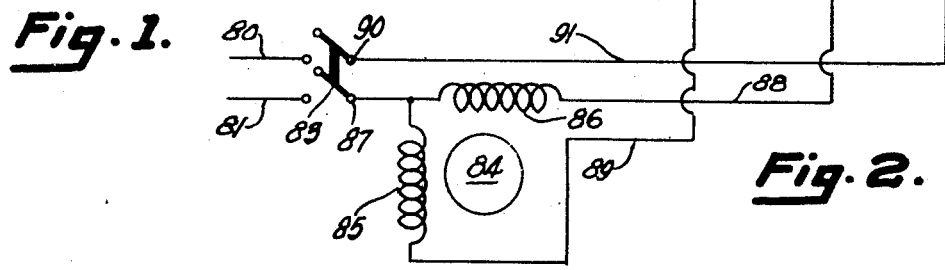
Fig. 2 is a similar view combined with a diagrammatic portion showing its connection with an electric motor, the device being in the circuit breaking position.

As shown in Fig. 2, the numerals 80 and 81 designate the power lines to which the electric motor is adapted to be connected by a switch 83. The electric motor is designated by the numeral 84. This motor has a starting winding 85 and a running winding 86. One end of starting winding 86 and likewise one end of the running winding 85 are connected to terminal 87 of the switch 83. The other end of the running winding 86 is connected by wire 88 with the stationary terminal 45 of the control device. The other end of the starting winding 85 is connected by wire 89 with the terminal 40 of the control device. The terminal 90 of the switch 83 is connected by wire 91 with the ear 22 of the frame 21 and through the frame and the nut 24 electrically engaging said frame is connected with the thermo-electric element 26.

The present control device with its connected electric motor as shown in Fig. 2 may be used in various installations, as for instance in a refrigeration system where the motor 84 drives the refrigeration machinery. In such a system, switch 83 might be an automatic circuit make and break device of standard type which, in response to a selected high temperature, would automatically close to start the motor for driving the refrigerating machinery and at a predetermined low temperature would break the motor circuit to stop the motor and terminate refrigeration. Thus switch 83 would act automatically to start and stop the motor in accordance with temperature conditions in the refrigerator.

To start the motor, switch 83 is closed, permitting current to flow from the running winding 80 across the switch through wire 91 to the frame 21 and thence through its contacting nut 24 through the thermo-electric element 26. From this thermo-electric element which is attached to the switch frame 31, current will flow through said frame and under these conditions the switch, being in the position as shown in Fig. 1, current will flow through a divided circuit from frame 31, first through contact blade 64 across contacts 65 and 42, terminal 40 through the wire 89, starting winding 85 of the motor back to the opposite power line 81 through the switch 90. The other divided circuit from the frame 31 includes contact blade 53 across contacts 55 and 47 to terminal 45, thence through wire 88, running winding 86 of the motor 84 to the opposite power line 81. Current flowing across both pairs of engaging contacts 65—42 and 55—47 and consequently through the starting and running windings 85 and 86 of the motor, causes said motor to run. With these circuits closed a heavy surge of current initially traverses the thermo-electric element 26 which, as aforedescribed, is in circuit with both motor windings. The heavy surge of current through said thermo-electric element 26 causes it to warm up, resulting in an expansion thereof. As the thermo-electric element 26 expands, the spring 35 is rendered effective to move the switch frame 31 in a clockwise direction whereby the seating points of the resilient fingers 56 and 66 of the spring blades 64 and 53 respectively are moved from the left sides of said contact blades toward said blades and eventually to the right sides thereof. The device and particularly the thermo-electric element 26 is so designed that, after a normal starting current has traversed it for a predetermined length of time, it will expand sufficiently to permit spring 35 to move the switch frame 31 so that the seating point of the resilient finger 66 in the V-notch 50 of the switch frame 31 will be moved to the right side of the blade 64, at which time said finger 66 exerts a force to urge the blade 64 counterclockwise whereby contact 65 is moved out of engagement with its cooperating contact 42 and the starting circuit is broken. Now only the circuit through running winding 86 is maintained and if the motor operates under normal current conditions the thermo-electric element 26 will not be heated up sufficiently to cause further expansion and therefore the spring 35 will maintain the switch frame 31 in the position in which contact 55 is maintained in engagement with contact 47 to continue the running winding circuit.

As the contact blade 64 is moved by the resilient finger 66 to disengage its contact 65 from the cooperating contact 42, this contact blade 64 will be urged into engagement with the stop stud 70. If, in the installation, the control device is mounted upon or adjacent to the electric motor, the ambient temperature caused by heating of the motor will effect the adjustment of the stop stud 70 through the agency of the thermal element 73 which carries said stop stud.

If, due to abnormal conditions during the motor operation such as overload or the like, an abnormal current flow traverses the thermo electric element 26, an increased heating thereof will obtain and consequently said thermo electric element will further expand, permitting spring 35 again to move the switch frame 31 clockwise so as to move the seating point of the resilient finger 56 in the V-notch 51 of the frame 31 to the right of contact blade 53, at which time said resilient finger will quickly urged the blade to separate its contact 55 from the cooperating contact 47 and thus break the motor running circuit and stop motor operation. A movement limiting blade 92 is interposed between contact blades 64 and 53 whereby the counterclockwise movement of the blade 53 under the effect of spring finger 56 is always limited and controlled by the position of blade 64.

When the motor is operating normally, that is, under normal current conditions and at normal motor temperature, expansion of the thermo electric element 26 due to the surge of current, will permit spring 35 to operate the switch and separate contacts 65 and 42, at which time blade 64 is urged against the stop stud 70 by the resilient finger 66 of said blade 64. If under these conditions the operation of the motor is stopped by the breaking of the line circuit either normally or by some automatic control in the installation with which the control device and motor are combined, current will cease to flow through the element 26 and it will cool off, contract and move to actuate frame 31 against the effect of spring 35 to engage the contacts 65 and 42 and thus complete the starting winding circuit of the motor. After this, when the circuit is again closed either manually or by the demands of the system, through the automatic means, the starting cycle is again repeated and only the normal movement of the switch frame 30 is necessary to shift the resilient finger 66 from the contact closing into the contact opening position, as has been described heretofore. However, if for any reason the ambient temperature of the motor will have arisen, the thermo electric element 73 will be affected by said rise in temperature ambient thereto automatically to move the stop stud 70 in a direction away from the stationary contact 42 so as to increase the distance between said stationary contact and the stop stud. Now when the contact blade 64 engages the stop stud 70, it will lie a greater distance from its cooperating stationary contact 42 and also the seat of the resilient finger 66 will be a greater distance to the right of contact blade 64 than normally. With the blade 64 resting in its "off" position a greater distance than normally from the stationary contact 42, a longer cooling off period and consequently a greater contraction of the thermo element 26 is necessary to again move the frame 31 so that the point of engagement of notch 50 with the resilient finger 66 is moved to the left of blade 64 to urge it into contact closing position. Increasing the movement of the contact 65 from its "off" or contact disengaging position to its "on" or contact engaging position naturally increases, as has been said, the contraction period of the thermo electric element 26 and, due to these increases the motor will have longer "off" periods and therefore will be permitted to attain temperatures of lower value in itself. The longer the "off" period for the motor, the better opportunity it has to cool and therefore if any condition exists which causes heating up of the motor, the thermo element 73 adjacent the motor will, by the motor temperature ambient thereto, so adjust said thermo element to move the stop stud 70 and cause an increased separation of the contacts 65 and 42 in the starting circuit. It will of course be seen that with an increased separation, an increased movement is necessary to cause their engagement, and inasmuch as this movement is obtained by a contraction of the thermo electric element 26, a longer period of time between motor activity is provided, thereby permitting the motor to cool and thus limiting motor temperature to lower values.

The flange 75 on the stop stud renders the stop constant below a predetermined temperature.

The thermo-electric element 26 may, due to heating thereof, expand sufficiently to permit spring 35 to shift the switch frame 31 clockwise as regards Fig. 1, so that both sets of contacts are separated as shown in Fig. 2. Element 26 is adjustably positioned by the nut 24 so that, when cool, it contracts and moves switch frame 31 against the effects of spring 35 so that both sets of contacts are engaged as shown in Fig. 2. Thus expansion and contraction of the element 26 effects the movement of the switch frame within a certain range to open and close the contacts.

The thermo element 73 adjusts the degree of contact separation in accordance with temperatures ambient thereto, thus varying the length of "off" cycle of the motor. If the ambient temperature should be higher than a reasonable safe degree, thermo element 73 would, in response to such a dangerously high temperature, move the stop stud away from the blade 62 so that when next said blade is shifted out of contact engaging position by the expanding thermo-electric element 26, it will rest against said stop 70 in a position beyond the range of frame movement. That is, when next the frame 31 is moved counter-clockwise by contraction of element 26, its range of movement is not sufficient to move the seating point of finger 66 in the bottom of notch 50 up to the blade 64 in its present position. To effect movement this seating point must be moved beyond the blade 64. Under these conditions the thermo element 73 becomes the primary temperature control, and even though element 26 has cooled and contracted sufficiently to effect switch frame movement to close the contacts, said contacts cannot close until the ambient temperature has lowered sufficiently to cause the thermo element 73, heavier and considerably slower acting than element 26, to move the stop stud 70 inwardly and with it the blade 64. When said thermo controlled stop has moved the blade so it passes over and beyond the seating point of its finger 66 in the V-slot 50, the blade will be thrown quickly into its contact engaging position and, due to the connector bar 92, blade 53 and its contact will likewise be shifted into contact engaging position. Thus the thermo-electric element is the switch actuator control within a certain range of temperatures and when said temperatures rise above said range the thermo-element 73, merely an adjuster during said certain range, actually becomes the actuator for effecting contact engagement.

From the aforegoing it will be seen that applicant's present control device not only provides starting control and overload protection to the motor, but it also provides a dual protection for the motor against overheating by increasing the "off" periods of the motor in accordance with temperatures ambient thereto.

While the embodiment of the present invention as herein disclosed constitutes a preferred form, it is to be understood that other forms might be adopted, all coming within the scope of the claims which follow.

What is claimed is as follows:

1. A control switch comprising, in combination, a stationary frame, a movable contact carrying member; flexible means securing said member to the frame; an actuator for said member; stationary contacts; flexible contact blades carried by said member and having over-center means for shifting said contact blades toward or away from said stationary contacts in response to a predetermined movement of the contact carrying member in one direction or the other respectively; a spacer bar between said blades; a stop engageable by one of said blades to limit its movement away from the stationary contact; and thermal means secured to the frame and carrying the stop for adjusting its position relatively to the one of said blades in accordance with temperatures ambient to the switch.

2. A control switch comprising, in combination, a stationary frame; a movable frame; a spring securing the movable to the stationary frame; stationary contacts; resilient contact blades attached to the movable frame, said blades having an over-center finger engaging said movable frame for shifting the blade toward or away from the stationary contacts as the movable frame is predeterminately moved counterclockwise or clockwise respectively; a spacer bar between said blades; a stop engageable by one of the blades as it is moved away from the stationary contact; a bimetal strip secured to the stationary frame and carrying the stop for adjusting it relatively to the contact blade adapted to engage it, in accordance with temperatures ambient thereto; and a thermo-electric actuator attached to the movable frame for operating the movable frame in opposition to the spring.

3. A control switch comprising, in combination, two stationary frames insulated from each other; a movable carrier; a blade spring flexibly securing the carrier to one of the stationary frames; two stationary contacts; flexible contact blades secured at one end to the carrier and having resilient fingers engaging the carrier for shifting the blades toward and away from the respective stationary contacts as the carrier is moved relatively to the said one frame; a spacer bar between the free ends of the contact blades; a stop slidably mounted on the said one stationary frame, engageable by one of the flexible blades as it is moved away from its respective stationary contact; a member adjustably secured to the stop; a bimetal element anchored to the said one frame and secured to said member; and a thermoelectric actuator secured to the carrier and to the other stationary frame for actuating the carrier in opposition to the blade spring.

CALVIN J. WERNER.

REFERENCES CITED

The following references are of record in the file of this patent:

UNITED STATES PATENTS

| Number | Name | Date |
| --- | --- | --- |
| 1,596,018 | Mueller | Aug. 17, 1926 |
| 1,839,935 | Thomas | Jan. 5, 1932 |
| 2,129,867 | Pearce | Sept. 13, 1938 |
| 2,242,769 | Werner | May 20, 1941 |
| 2,304,018 | Raney | Dec. 1, 1942 |